Sept. 24, 1968  H. R. SCIBBE  3,402,973
ANTI-SKID MODULATED BRAKE SYSTEM RESPONSIVE TO
ROTATIONAL AND LINEAR DECELERATION
Filed March 24, 1966  3 Sheets-Sheet 1
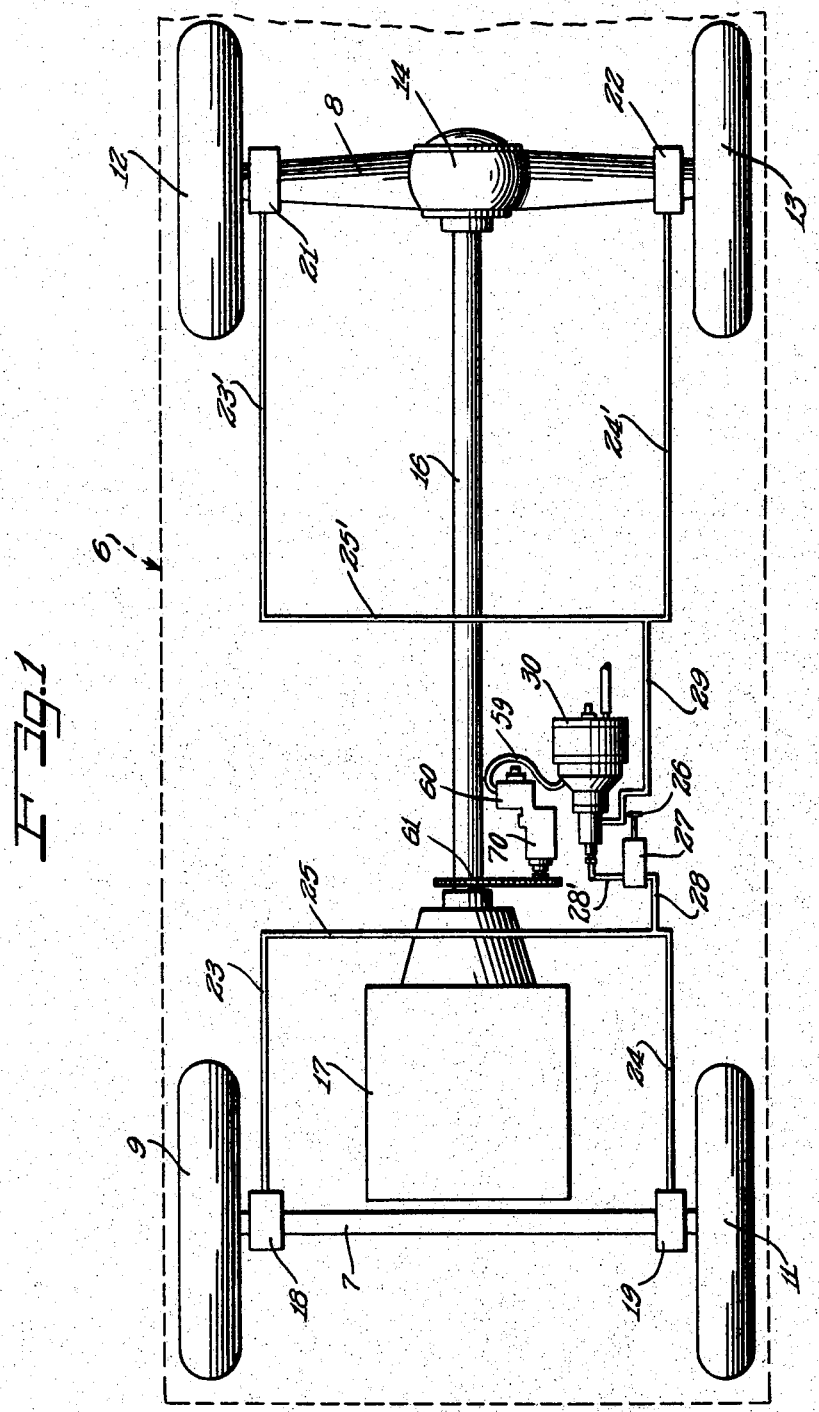
INVENTOR.
Harold R. Scibbe
BY Hill, Sherman, Meroni, Gross & Simpson ATTORNEYS

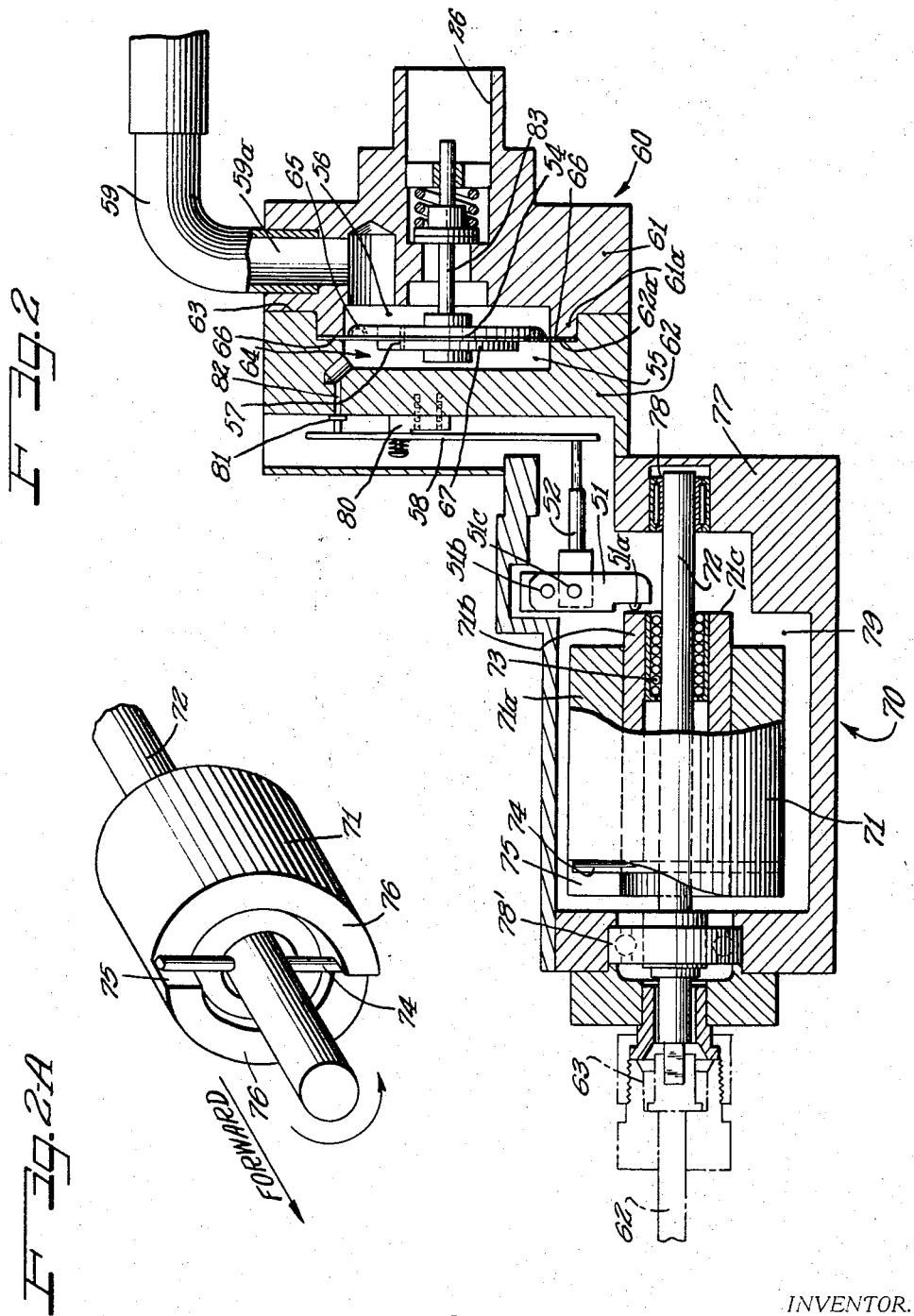

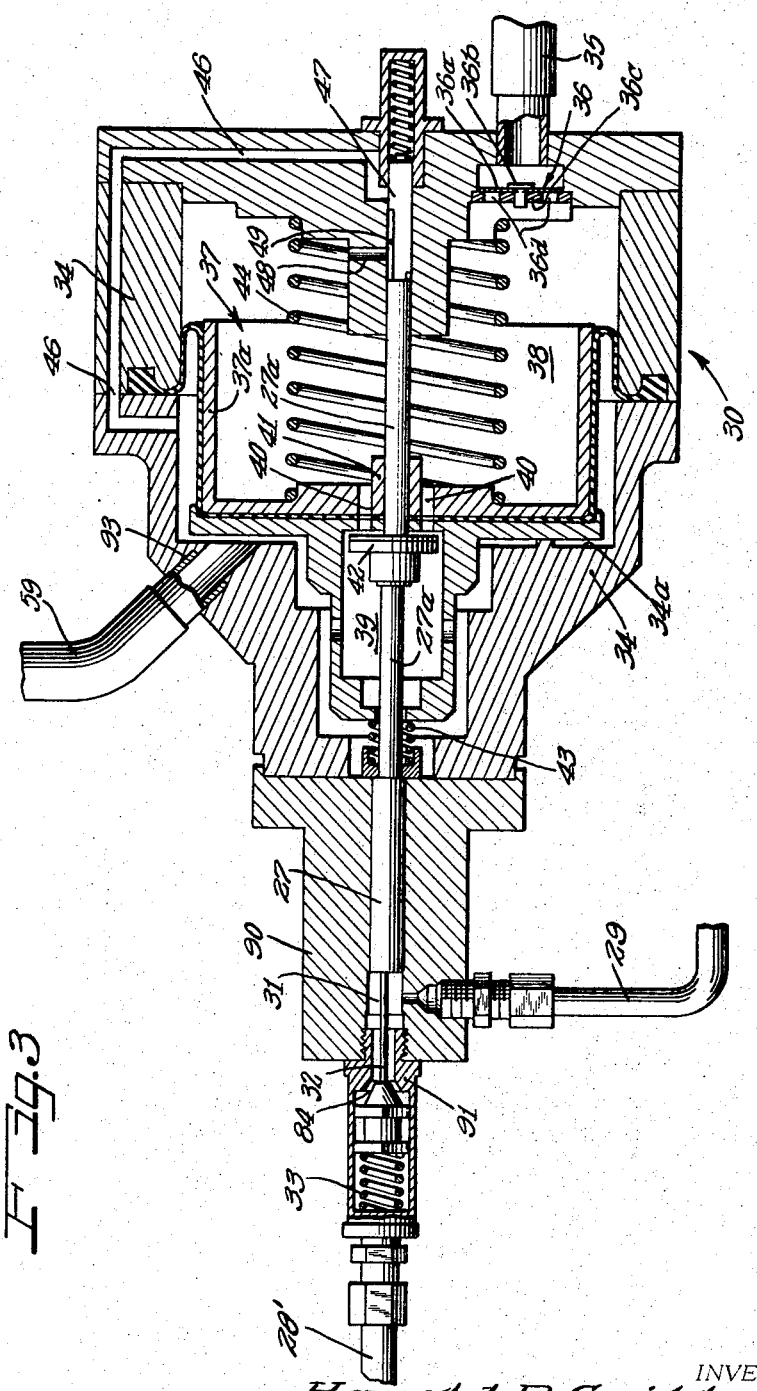

United States Patent Office 3,402,973
Patented Sept. 24, 1968

3,402,973
ANTI-SKID MODULATED BRAKE SYSTEM RESPONSIVE TO ROTATIONAL AND LINEAR DECELERATION
Harold R. Scibbe, Chardon, Ohio, assignor to TRW, Inc., Cleveland, Ohio, a corporation of Ohio
Filed Mar. 24, 1966, Ser. No. 537,080
12 Claims. (Cl. 303—21)

ABSTRACT OF THE DISCLOSURE

An anti-skid brake control including a cylindrical mass mounted in a housing for rotary and linear motion and being driven into rotation at a speed which is a function of the speed of the wheels of the vehicle. The mass has a cam surface, and the rotary drive member associated therewith has a cam follower which makes the unit sensitive to the difference between angular and linear deceleration of the vehicle. The difference between the angular and linear deceleration of the vehicle is then detected, applied to a servo amplifier system and to an actuator for closing off the hydraulic lines leading from the master cylinder to the wheel brakes to release the same, thereby preventing an impending vehicle skid.

---

The present invention relates to improvements in brake systems for vehicles and particularly relates to a new and improved anti-skid brake control system. While generally useful in many types of vehicles, the brake control of this invention is particularly valuable when applied to conventional automobiles and functions so that wheel lock resulting in wheel skid and loss of vehicle control is anticipated and prevented.

To maintain maximum effectiveness in braking, safety and steerability, vehicle deceleration and wheel deceleration must remain proportional throughout the braking operation until vehicle movement and wheel rotation cease simultaneously.

The anti-skid system described herein continuously monitors linear decelerations of the vehicle and angular decelerations of the non-steerable rear wheels. The present invention includes control of hydraulic brake pressure so as to avoid braking effort which would cause wheel deceleration to depart from this proportionality to vehicle deceleration.

It is the general object of the present invention to provide a new and improved brake system for use in vehicles subject to skidding.

An object of the present invention is to provide an improved control mechanism for a braking system in a wheeled vehicle which operates to compare the linear deceleration of the vehicle with the angular deceleration of selected wheels and to automatically reduce the braking effort when the ratio of angular deceleration to the linear deceleration exceeds a predetermined value.

Another object of the invention is to provide an improved and simplified mechanism for measuring the angular deceleration of wheels of a vehicle being braked.

A still further object of the invention is to provide an improved mechanism for measuring and automatically comparing linear and angular deceleration, and for providing an actuation signal when angular deceleration exceeds a predetermined quantity relative to linear deceleration.

A particular object of the invention is to provide an anti-skid brake control system which has the ability to modulate brake pressure during a maximum braking effort.

Other objects and advantages will become more apparent with the teaching of the principles of the invention in connection with the disclosure of the preferred embodiment thereof in the specification, claims and drawings, in which:

FIG. 1 is a plan view, shown in somewhat schematic form, of an anti-skid brake control embodying the principles of the present invention;

FIG. 2 is a detailed view, largely in longitudinal cross-section, of a part of the mechanism depicted in FIG. 1;

FIG. 2A is a perspective view of a part of the mechanism of FIG. 2A which is useful in understanding the operation of that mechanism; and FIG. 3 is a detailed view, largely in longitudinal cross-section, of another part of the mechanism depicted in FIG. 1.

In FIG. 1, a vehicle is illustrated at 6 in schematic form, and is an automobile or similar vehicle. The vehicle is provided with a front axle 7 and a rear axle 8 with front wheels 9 and 11 attached at the ends of the front axle, and rear wheels 12 and 13 at the ends of the rear axle.

The vehicle is propelled by driving the rear wheels through a differential gearing 14 which is connected to the wheels through shafts in the rear axle 8. The rear axle 8 may take the form of a housing in the usual automotive type of drive with the axle shafts enclosed, as will be appreciated by those skilled in the art. The power is delivered to the rear wheels through differential gearing within the differential housing 14 by a propeller or drive shaft 16 which is connected to the engine 17. The usual fluid drive mechanism or clutch and the usual universal joint (not shown) will be provided for the transmission of power from the engine through the drive shaft 16.

Each of the individual wheels is individually braked with brakes 18 and 19 provided for the front wheels 9 and 11, and brakes 21 and 22 provided for the rear wheels 12 and 13.

The brakes are illustrated as hydraulically actuated and are supplied with hydraulic actuating fluid. The front brakes 18, 19 are applied respectively with the hydraulic fluid from the tubular interconnectors or lines 23, 24 which are interconnected by line 25. Similarly, the rear brakes 21, 22 are supplied by hydraulic fluid pressure via lines 23', 24', respectively. The lines 23' and 24' are similarly cross-connected via line 25'.

The braking effort is applied to operating means including a master hydraulic cylinder 27 which is connected by a line 28 to the hydraulic fluid conduit 25. The master cylinder is provided with a piston actuated by a foot pedal 26. A second hydraulic cylinder output line 28' is connected, in accordance with the invention, to a braking control including an actuator 30 which may be a vacuum servo actuator of the type similar to that commonly used in present day automobile power brake systems. The ability to employ such an actuator is a further advantage of the present invention. From the actuator 30, an additional tube or line 29 further communicates the hydrostatic pressure, in a manner determined in accordance with the present invention, to the rear brake's hydrostatic cross line 25'. The actuator 30 is driven by a connecting duct or line 59 from a sensed signal amplifier 60 which may be a pilot-servo valve unit as depicted which is actuated from means for rate comparing comprising a decelerometer 70. The decelerometer 70 has an input which is proportional to or at some fixed speed ratio in relation to the rear wheels' rotational speed of the vehicle 6. This input may be derived from the drive shaft 16 by any convenient mechanism such as mechanism 61.

Referring now to FIG. 2 there is depicted the pilot and servo valve unit 60 and the decelerometer 70 in greater detail.

The decelerometer 70 includes a generally cylindrical inertia mass 71 which is mounted from its cylindrical axis to a shaft 72 which lies parallel to the direction of normal forward motion of the vehicle 6. The mass 71 comprises two cylindrical portions, an outer shell 71a and inner shell 71b, which are affixed to one another to form one mass. Ball bearing bushings 73 are provided between the shaft 72 and the cylindrial mass 71 for decreasing the rotation friction between the shaft 72 and the rotational mass 71. As best shown in FIG. 2A, the mass 71 is free to rotate about the shaft 72 but for the interaction between a surface following member or drive pin 74, a pair of abutments 75, and a sloping or inclined cam face surface 76 of the forward facing surface of the mass 71. The face of this mass 71 is canted to the direction of longitudinal travel for the mass 71 thus preventing longitudinal movement of the mass 71. Looking at it another way, if the pin 74 is to travel away from the abutment 75 it must move the mass 71 longitudinally along the shaft 72 by its interaction with the inclined surface 76.

As mentioned before, the decelerometer 70 is supplied with a rotational input that is a function of the rotation of the rear wheels. As best shown in FIG. 2, this input is supplied via the mechanism 61 which may include a flexible shaft 62 joined in a conventional manner as at 63 to the shaft 72 for rotation thereof. The shaft 72 is mounted at its extreme ends to a housing 77 by means of anti-friction bearings 78, 78'. The housing 77 defines a chamber 79 enclosing the central portion of the shaft 72 and the rotating cylindrical mass 71. The chamber 79 has sufficient clearance in the rearward direction behind the rotating mass 71 for allowing it to slide relation to the shaft 72 in response to linear acceleration or deceleration of the vehicle 6.

The decelerometer 70 is mounted so that the shaft 72 is parallel to the longitudinal axis of the vehicle with the drive coupling or flexible shaft 62 toward the front. Deceleration of the vehicle, while in forward motion, urges the inertial mass 71 toward the drive coupling 62. Such forward motion of the mass 71 is restained by the drive pin 74 fixed in the shaft 72. The drive pin 74, normally in contact with the abutments 75 of the face cam 76, causes the mass 71 to rotate in unison with the shaft 72, hence at some fixed speed ratio with the rear wheels of the vehicle. Being driven at a fixed speed ratio of the rear wheel rotational speed, the angular deceleration rate of the mass 71 is also proportional to the rear wheel deceleration rate.

The design of inertial mass 71, including the lead angle of the face cam 76, is such that its axial force component of rotational inertia during a deceleration is equal in magnitude, but opposite in direction, to the axial force due to linear deceleration of the mass 71. During optimum braking, the angular deceleration rate of the rotating wheels remains proportional to the linear deceleration rate of the slowing vehicle. Both deceleration rates should reach zero simultaneously at proportional rates if there is to be no wheel lock or skid. Under these conditions, the mass 71 and the shaft 72 cease rotation simultaneously and there is no relative motion between the two.

When braking effort is excessive for the existing tire-to-road adhesion factor, the angular deceleration of the wheels 12, 13 will reach zero before all or any linear inertia of the vehicle 6 has been absorbed. Under such conditions the locked wheels 12, 13 skid and in conventional automobiles the rear wheels commonly lock first. At wheel lock and at impending wheel lock, the mass 71 tends to remains in rotational motion as the shaft 72 is being braked to a halt by its connecting drive to the rear wheels 12, 13. Rotational inertia of the mass 71 is translated into a rearward force by the lead angle of the face cam 75 acting on the drive pin 74. Since the forward force of a lagging linear deceleration of the mass 71 cannot balance the translated rearward force, the mass 71 moves toward the rear. The rearward movement of the mass 71 is sensed by appropriate sensing means such as the pivoted arm 51 which has a roller bearing contact 51a at one end for contact with the planar rearward end surface 71c of the cylinder 71b of the mass 71. The arm 51 is pivoted at its other end 51b and is pivotally affixed at 51c to a second linkage arm 52. With the rearward movement of the mass 71, the linkage arm members 51 and 52 are consequently moved toward the rear in proportion to the force differential.

The pilot and servo valve unit 60 is essentially a pneumatic signal amplifier to control atmospheric air flow into the actuator 30. The unit 60 includes a housing made up of two portions 61, 62 which mate and are affixed together generally along a plane 63. The housing 61, 62 is preferably affixed to the housing 77 of the decelerometer 70 to form one easily handled assembly. The housing 61, 62 defines an internal cavity 64 of a generally disc shape. The unit 60 has an atmospheric admission valve 53 actuated by a vacuum-balanced diaphragm assembly 54 which divides the internal cavity 64 into two chambers 55 and 56. Evacuation of the chamber 56 is accomplished via a duct 59 which communicates a vacuum through a suitable passageway 59a formed in the housing portion 61. The chamber 55 is evacuated via an orifice 57, through the diaphragm assembly 54. The diaphragm assembly 54 includes a generally circular diaphragm 65 which is entrapped and sealed out about its outer periphery 66 by a circular outstanding flange 61a of the portion 61 and a confirming surface 62a of the portion 62. Between its entrapment at 66 and a smaller disc-shaped portion 67, the diaphragm is made of a flexible sheet material, such as rubber, and includes a surplus of material so as to allow its center portion 67 to travel with changes in pressure between the chambers 55 and 56. At its center, the diaphragm 65 is affixed to an outstanding shaft or valve stem 83 for moving that shaft.

Because force differentials signifying impending wheel lock may be quite small at the link 52, a pilot valve 81 capable of sensing small displacements is employed to trigger the diaphragm actuated atmospheric valve 53. Rearward motion of the link 52 causes a lever 58, affixed at the end of the link 52, to pivot about its fulcrum 80 and raise the pilot valve 81 from its seat. The opening valve 81 permits atmospheric air to enter the chamber 55 through a passage 82 formed in the housing portion 62. The momentary pressure differential across the diaphragm 54 moves the diaphragm 54 and its valve stem 83 slightly into the chamber 56 and thereby unseats the valve 53, permitting a large volume flow of air to enter from the port 26 and flow into the duct 59, through the chamber 56.

After the pilot valve 81 has been reseated by the return of the mass 71 to its "no skid" position, the pressure balance in the chambers 55 and 56 is re-established via an orifice 57, and the valve 53 is reseated stopping air flow into the chamber 56 and the duct 59.

Referring to FIG. 3, there is depicted the vacuum servo actuator 30. The actuator 30 functions to control the hydrostatic brake pressure derived from the brake master cylinder via the line 28' which is applied to the rear wheel brakes via the line 29. It controls the hydrostatic pressure in the line 29 by using a valve 84 as means for braking communication between the master cylinder and the rear brakes and by means of a controlled volume 31 in the rear braking circuit which is altered in response to the sensed conditions of the decelerometer 70. The actuator 30 functions to provide the force required to actuate the accumulator piston 27 against brake circuit pressures. Movement of the accumulator piston 27 which is seated in a housing 90 adjusts the hydraulic pressure in the rear wheel brake circuit by altering the volume 31 defined by the housing and the piston 27.

The tube 28 is the hydraulic fluid line from the brake system master cylinder ordinarily common with the tube 29 serving both rear wheel brake cylinders. For the present invention, connection between the lines 28 and 29 is made through the normally open check valve 84 and the accumulator volume 31. A shaft 32 which is an integral extension of the piston 27, holds the check valve 84 off its seat 91 against the biasing force of a spring 33.

The actuator 30 includes a housing 34, which is essentially an airtight container, guiding and enclosing a diaphragm-piston assembly 37, which is evacuated through a duct 35 from a convenient source of vacuum such as the engine intake manifold. A check valve 36 positioned across the opening of the duct 35 into the interior of housing 34, retains the vacuum within the housing 34. The check valve 36, as depicted, comprises a flexible disc-shaped membrane 36a affixed at its center by means 36b to a disc-shaped member 36c which has a plurality of holes 36d therethrough. The membrane 36a is affixed to the vacuum side of the valve so as to deform and allow air flow out of the actuator 30. A diaphragm-piston assembly 37 divides the internal cavity of the housing 34 into two chambers 38 and 39. A number of communication ports 40, which pass through the piston 37, functions to normally permit pressure equalization in the chambers 38 and 39, and through the duct 59, which is in communication with the chamber 39 via inlet 93 of the housing 34, into the chambers 55 and 56 of the pilot-servo valve 60 (FIG. 2).

Piston 37a of the assembly 37 is slidably guided by a bushing 41 on a shaft 27a, an extension of the accumulator piston 27. In the absence of hydraulic pressure in the line 28 and the cavity 31, the shaft 27a is positioned with respect to the piston 37 by a biasing means or spring 43 so that a valve 42, fixed to the shaft 27a, remains unseated from the ports 40 passing through the piston 37a for permitting communication between the chambers 38 and 39. In every brake application, the initial hydraulic pressure rise within the volume 31 moves the piston 27 against the spring 43, until the valve 42 closes the ports 40. Further movement of the piston 27, as maximum brake system pressures are applied, is resisted by a coil-spring 44 positioned for holding the diaphragm-piston assembly 37 against an end wall 34a of the chamber 39. The actuator 30 is designed so that this movement of the accumulator piston 27, while sufficient to close the valve 42, does not permit closing of the hydraulic check valve 84. The length of the extension shaft 32 is such that it must hold the valve 84 open to permit full brake system pressures into the line 29 to the rear wheel brake cylinders.

In a brake application situation with impending rear wheel lock, inertial mass 71 (FIG. 2) responds to the imbalance of inertial forces and opens the pilot valve 81. The atmospheric valve 53 is thus opened and admits atmospheric pressure into the duct 59. The pressure in the chamber 39 (FIG. 3) rises above that of the chamber 38, and as the ports 40 having been closed by the valve 42 during the initial hydraulic pressure rise, the diaphragm-piston assembly 37 is urged toward a chamber 38 against the spring 44. Hydraulic pressure in the cavity 31 causes the piston 27 to follow movement of the piston 37 thus enlarging accumulator volume 31 and simultaneously closing the check valve 84. Once the check valve 84 has been closed, enlargement of the accumulator volume 31 results in a lowering of hydraulic pressure in the line 29 to the rear brakes. As the decreasing hydraulic pressure in the line 29 and in the volume 31 approaches that initial pressure which moved the piston 27, the spring 43 will move the piston 27 and the affixed valve 42 relative to the piston 37 and re-open the communicating ports 40.

As the accumulator piston 27 follows movement of the diaphragm-piston assembly 37 to reduce hydraulic pressure in the volume 31, the shaft extension 27a also moves a by-pass valve 47 against biasing spring 50. Movement of the valve 47 by virtue of its channel 49, establishes communication between a pair of passages 46 and 48 formed in the housing 34 which tends to re-equalize pressures in the chambers 38 and 39.

Lowering the hydraulic pressure in the line 29 having removed the tendency toward rear wheel lock, the mass 71 again rotates in unison with the shaft 72 and the pilot valve 81 is reseated. Subsequently, the atmospheric valve 53 (FIG. 2) is reseated and vacuum equilization in the chambers 38 and 39 follows. As the vacuum differential across the diaphragm-piston 37 (FIG. 3) decays, the spring 44 urges the piston 37 and the piston 27 toward their original positions, thus increasing the hydraulic pressure in the volume 31 and in the line 29, and eventually reopens the hydraulic check valve 84. If conditions for rear wheel lock still prevail, the inertial mass displacement signal will cause the cycle to be repeated.

It will be apparent that many modifications and variations may be effected without departing from the scope and the novel concepts of the present invention. For example, the invention has been described as employing control of the rear wheel hydraulic brake circuit only, but it will be understood that it may equally be employed for control of the entire braking circuit. It is to be understood therefore that it is not intended to limit the invention to the specific form disclosed, but instead to cover all modifications, changes and alternative constructions and methods falling within the scope of the principles taught by the invention.

I claim as my invention:

1. In a braking system for a vehicle having braking means for at least one of the vehicle wheels and operating means for applying said braking means, the improvement comprising:
   valve means coupled to the operating means for controllably releasing the braking means on at least one of the wheels;
   actuator means including a housing and a power piston disposed across the interior of the housing and dividing the same into first and second actuation chambers,
   first coupling means for communicating a low pressure source to said first actuation chamber,
   second coupling means for communicating a high pressure source to said second actuation chamber,
   said actuator piston being movable by a pressure differential developed thereacross and being coupled to said valve means to operate the same,
   said second coupling means including a servo amplifier means,
   said servo amplifier means having a pilot valve and a main valve,
   said main valve being responsive to the operation of the pilot valve to admit high pressure into said second actuation chamber, and
   sensor means continuously monitoring the linear deceleration of the vehicle and the angular deceleration of at least one wheel of the vehicle and being responsive to a given excess of angular deceleration over linear deceleration to operate said pilot valve, thereby causing the braking means to be released.

2. In a braking system for a vehicle having a plurality of wheels, which vehicle is subject to skidding during braking, and including means for propelling said vehicle, braking means for at least one of the vehicle wheels, and operating means coupled to said braking means for applying said braking means to restrain movement of the vehicle, the improvement comprising:
   valve means coupled to the operating means for controllably releasing the braking means on at least one of the wheels;
   actuator means including a housing and a power diaphragm disposed across the interior of the housing and dividing the same into first and second actuation chambers,
   first coupling means for communicating a vacuum source to said first actuation chamber,
   second coupling means for communicating a pressure source to said second actuation chamber,
   said actuator diaphragm being movable by a pressure differential developed thereacross and being coupled to said valve means to operate the same,
   said second coupling means including a servo amplifier means, said servo amplifier means having a pilot valve and a main valve, said main valve being responsive to the operation of the pilot valve to admit atmosphere into said second actuation chamber, and orifice means normally equalizing the pressure across the power diaphragm when said pilot valve is inoperative, sensor means continuously monitoring the linear deceleration of the vehicle and the angular deceleration of at least one wheel of the vehicle and being responsive to a given excess of angular deceleration over linear deceleration to operate said pilot valve, thereby causing the braking means to be released.

3. An anti-skid brake system in accordance with claim 1 wherein said servo amplifier means comprises:

a servo housing having a cavity formed therein, a servo diaphragm extended across the interior of said cavity and dividing said cavity into first and second servo chambers, means for communicating said first servo chambers with a vacuum source, means for equalizing the pressure between said first and second servo chambers when said pilot valve is inoperative, said pilot valve having means for admitting atmosphere into said first servo chamber thereby causing said servo diaphragm to translate within said cavity, and said main valve being coupled to said servo diaphragm and being movable thereby to communicate a relatively large atmosphere source directly to said second actuation chamber of said actuator housing.

4. An anti-skid brake system in accordance with claim 2 wherein means are provided to communicate said first servo chamber of said servo amplifier means to said second actuation chamber of said actuator housing whereby said orifice means couples said first servo chamber to the vacuum source applied to said first actuation chamber of said actuator housing.

5. In a braking system for a vehicle having a plurality of wheels, which vehicle is subject to skidding during braking, and including means for propelling said vehicle, braking means for at least one of the vehicle wheels, and operating means coupled to said braking means for applying said braking means to restrain movement of the vehicle, the improvement comprising:

valve means coupled to the operating means for controllably releasing the braking means on at least one of the wheels, actuator means including a housing and a power diaphragm disposed across the interior of the housing and dividing the same into first and second actuation chambers, first coupling means for communicating a vacuum source to said first actuation chamber, second coupling means for communicating a pressure source to said second actuation chamber, said actuator diaphragm being movable by a pressure differential developed thereacross and being coupled to said valve means to operate the same, said second coupling means including a servo amplifier means, said servo amplifier means having a pilot valve and a main valve, said main valve being responsive to the operation of the pilot valve to admit atmosphere into said second actuation chamber, and orifice means normally equalizing the pressure across the power diaphragm when said pilot valve is inoperative, rate comparing means responsive to linear and rotary deceleration and being connected to said pilot valve for operating the same when the rotary deceleration is in excess of a predetermined relationship to the linear deceleration, said rate comparing means including a mass affixed for rotation about and movement along a shaft, said shaft and mass including means defining an inclined surface and surface following member, whereby any substantial deviation in the predetermined rates of angular wheel deceleration and linear deceleration results in a movement of said following member on said inclined surface which relative movement is sensed to activate said pilot valve, whereby said main valve is operated and a pressure differential is established across said power diaphragm to actuate said valve means, thereby releasing the braking means.

6. The improvement in a braking system as described in claim 4 wherein said valve means includes a valve to selectively isolate the braking means and defines a variable volume hydraulic chamber in hydraulic communication with said braking means in which the valve is operated and which chamber volume is increased so as to controllably release said braking means, said servo means being activated in response to the rearward motion of said cylindrical mass by means of a sensing linkage juxtaposed to the rearward facing portion of said mass.

7. The improvement as claimed in claim 5 in which said mass defines two inclined surface end abutments about the forward facing surface and said shaft following member including a drive pin which may set against both of said abutments during normal deceleration but which will move relative to said abutments on said inclined surfaces to cause said mass to move rearward on said shaft when the angular deceleration of the rear wheel is relatively greater than a predetermined relation to the linear deceleration of the vehicle.

8. In combination:

a vehicle having front wheels and rear wheels, a differential gearing drivingly connected to the rear wheels, an engine for driving the vehicle, a drive shaft connected between the engine and said differential gearing, braking means for the vehicle wheels, operating means connected to the braking means for simultaneously applying said braking means for restraining movement of the vehicle, an actuator coupled to said operating means for controllably releasing at least one of said braking means, a decelerometer comprising:

a housing, a generally cylindrical mass mounted for rotary and linear movement relative to said housing and mounted with its axis parallel to the direction of normal movement of the vehicle, said mass having a cam surface formed at the forward facing end wall thereof, said cam surface including an axially protruding abutment and a helical face extending from the abutment to a point on said end wall which is angularly spaced from the abutment, a drive shaft extending coaxially of said mass, said drive shaft being mounted for rotary movement relative to said housing and being maintained substantially linearly stationary relative to the housing, said drive shaft having a drive pin extending radially outwardly therefrom and engaging said abutment for normally driving said mass into a coextensive rotary motion, means for rotating said drive shaft as a function of the rotational speed of the vehicle wheels, and means coupling said mass to said actuator for operating said actuator in response to the linear movement of said mass when said drive shaft is rotatably decelerated relative to the linear deceleration of said mass at a rate greater than a predetermined ratio.

9. The improvement as claimed in claim 8 wherein said mass defines two helical surface end abutments about the forward facing end wall thereof and wherein said drive pin is set against both of said abutments during normal deceleration but will move relative to said abutments against said helical surfaces to cause said mass to move rearwardly when the angular deceleration of the rear wheels is relatively greater than a predetermined relation to the linear deceleration of the vehicle.

10. A vehicle brake system comprising:
braking means,
operating means connected to the braking means for applying the same,
an actuator coupled to the operating means for controllably releasing the braking means,
a decelerometer housing,
a generally cylindrical mass mounted for rotary and linear movement relative to said housing,
said mass having a forwardly facing cam surface including an axially protruding abutment and a helical face extending therefrom,
a support shaft extending coaxially with the mass and supporting the same for rotary and linear movement thereon,
said support shaft being rotatably mounted relative to the housing and substantially linearly fixed therein and having its axis extending in a direction parallel to the direction of normal vehicle movement,
means for rotating said support shaft at a function of the rotational speed of the vehicle wheels,
said support shaft having a cam follower extending outwardly therefrom for normally engaging said abutment to drive said mass into a rotary motion and for following said cam surface during excessive deceleration of said support shaft, and
means coupling said mass to said actuator for operating said actuator in response to the linear movement of said mass when said support shaft is rotatably decelerated relative to the linear deceleration of said mass at a rate greater than a predetermined ratio.

11. A vehicle brake system in accordance with claim 10 wherein said helical face is divided into first and second face portions, said first and second face portions being axially displaced relative to each other at the forward end wall of the mass and forming thereby first and second diametrically spaced abutments, said cam follower engaging both said abutments and driving said mass thereby into a rotary speed normally coextensive with the speed of said support shaft.

12. A braking system in accordance with claim 2 wherein a further valve means is operably associated with said orifice means for closing and opening the same, said further valve means being closed and opened in response to the actuation and deactuation, respectively, of the pilot valve, thereby causing the braking means to be released during an impending skid condition and causing said braking means to be readily reapplied after an impending skid condition has ceased.

References Cited
UNITED STATES PATENTS

| | | | |
|---|---|---|---|
| 2,163,731 | 6/1939 | Hallot | 188—181 |
| 2,796,482 | 6/1957 | Inderau | 188—181 X |
| 2,992,859 | 7/1961 | Sampietro | 303—24 |
| 3,223,459 | 12/1965 | Packer | 303—21 |
| 3,311,423 | 3/1967 | Horvath | 303—21 |
| 3,312,509 | 4/1967 | Highley | 303—21 |

DUANE A. REGER, *Primary Examiner.*